July 2, 1935.  N. M. LA PORTE  2,007,018
PROJECTING MECHANISM
Filed March 13, 1930  5 Sheets-Sheet 1

INVENTOR.
Norbert M. La Porte
BY
Kiddle Margeson and Lornidge
ATTORNEYS.

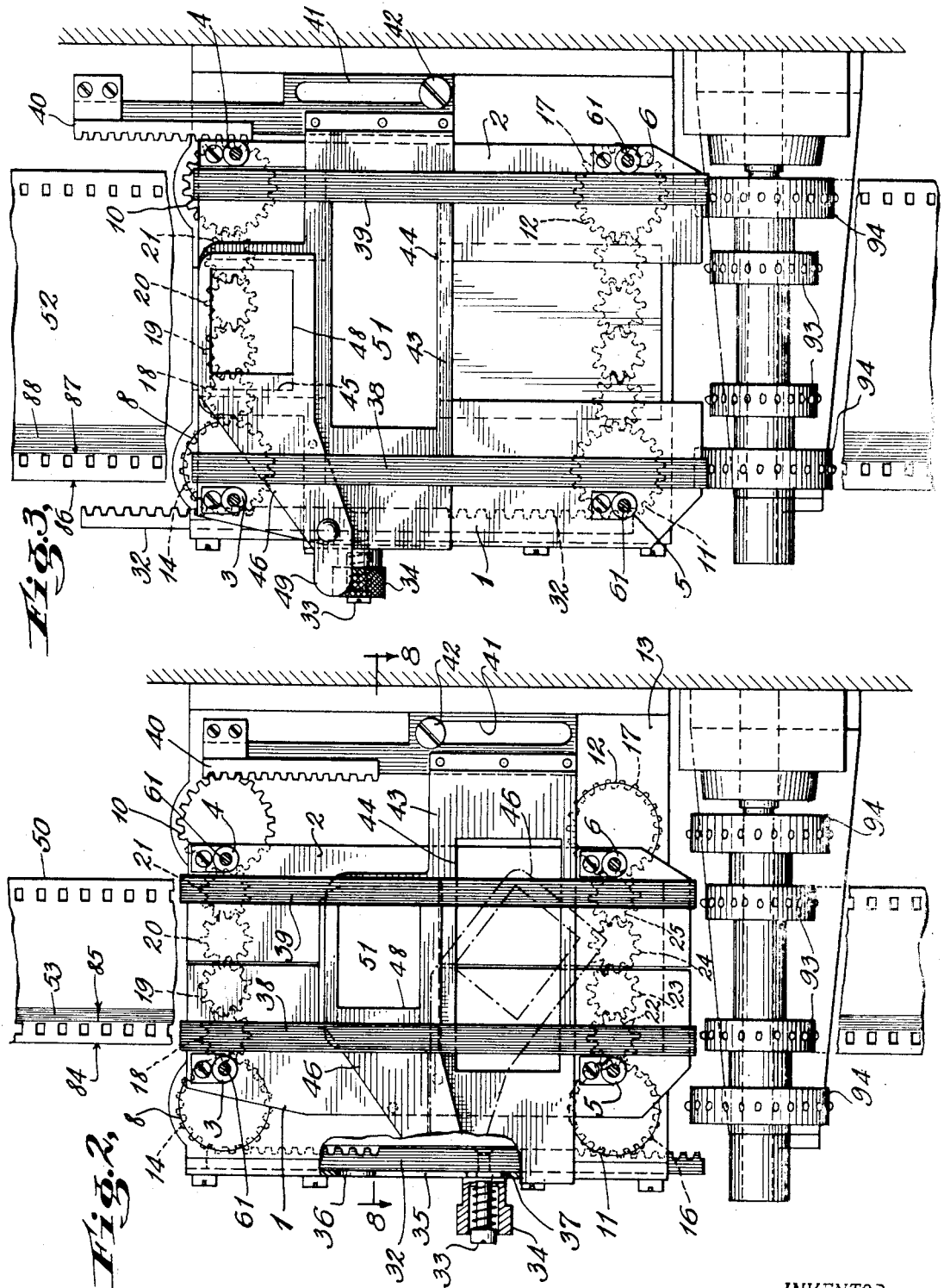

July 2, 1935.　　　　N. M. LA PORTE　　　　2,007,018
PROJECTING MECHANISM
Filed March 13, 1930　　　　5 Sheets-Sheet 3
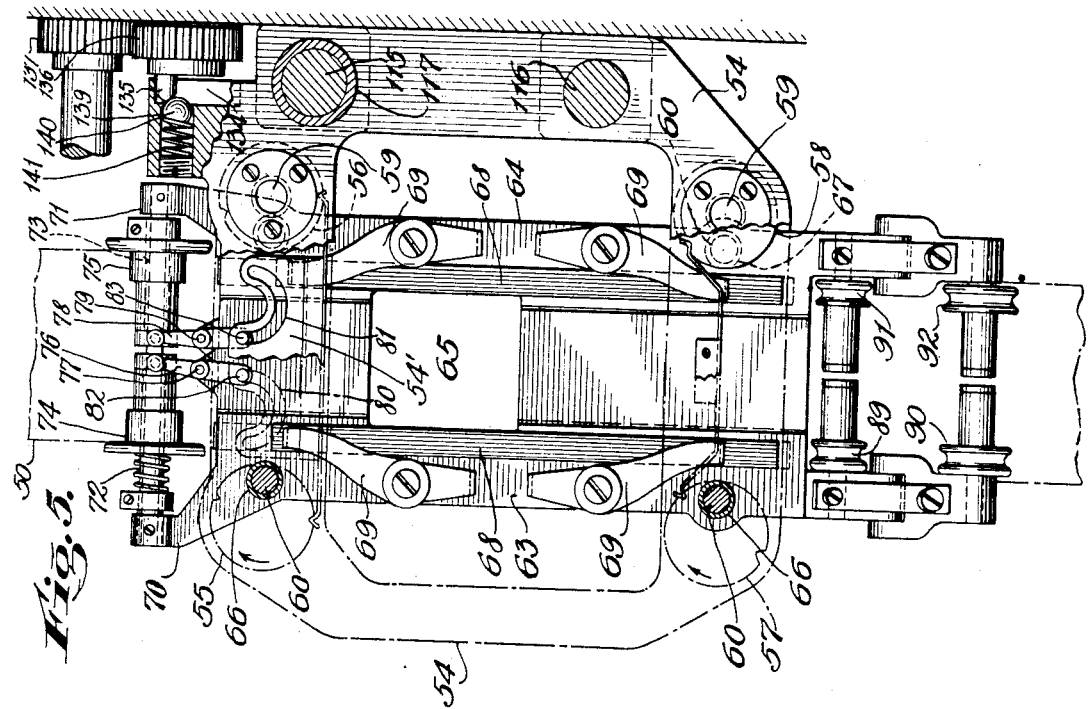
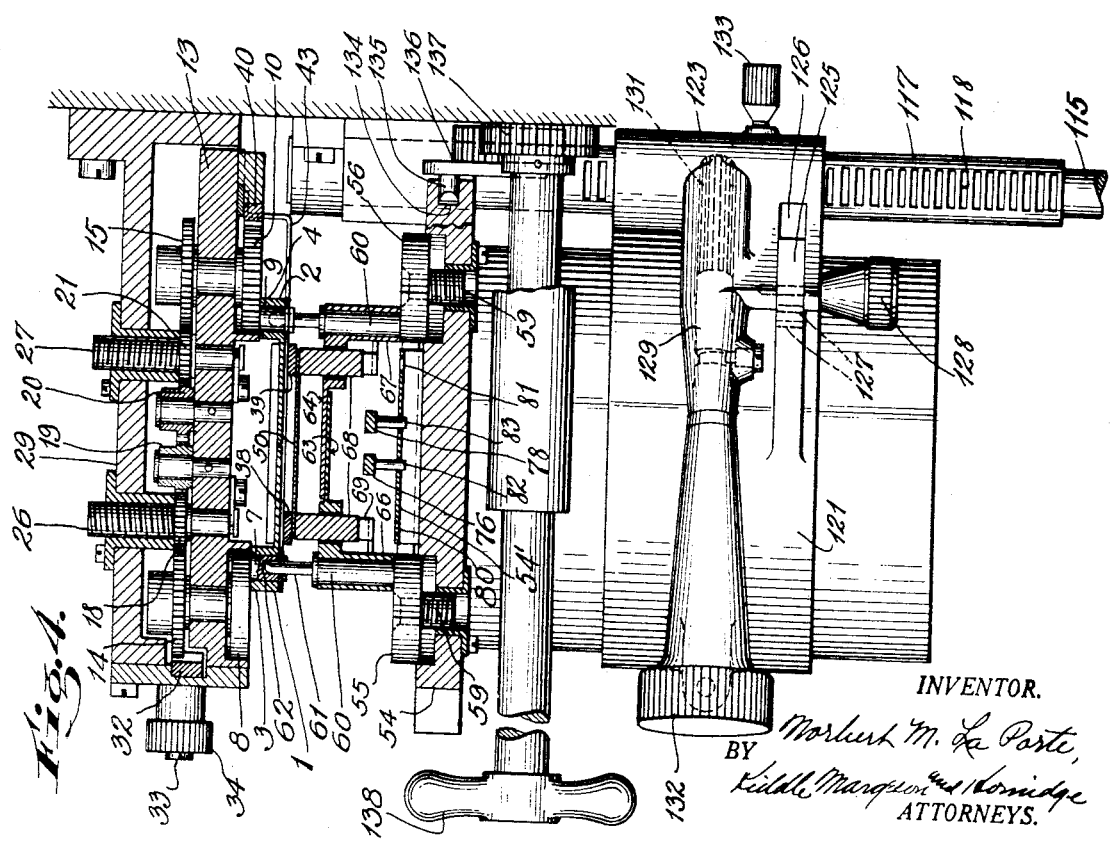
INVENTOR.
Norbert M. La Porte,
BY
Kiddle, Marquis and Loveridge
ATTORNEYS.

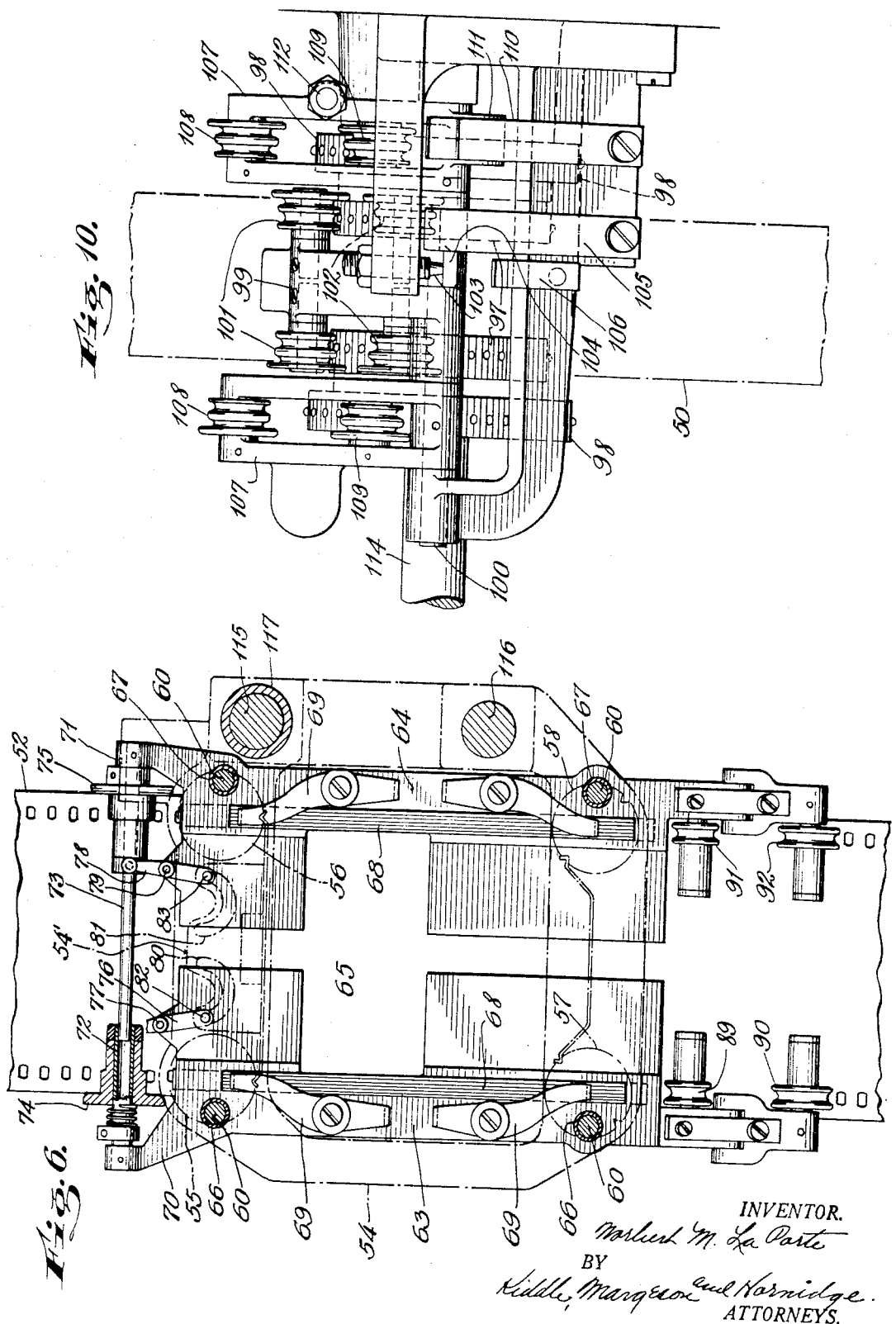

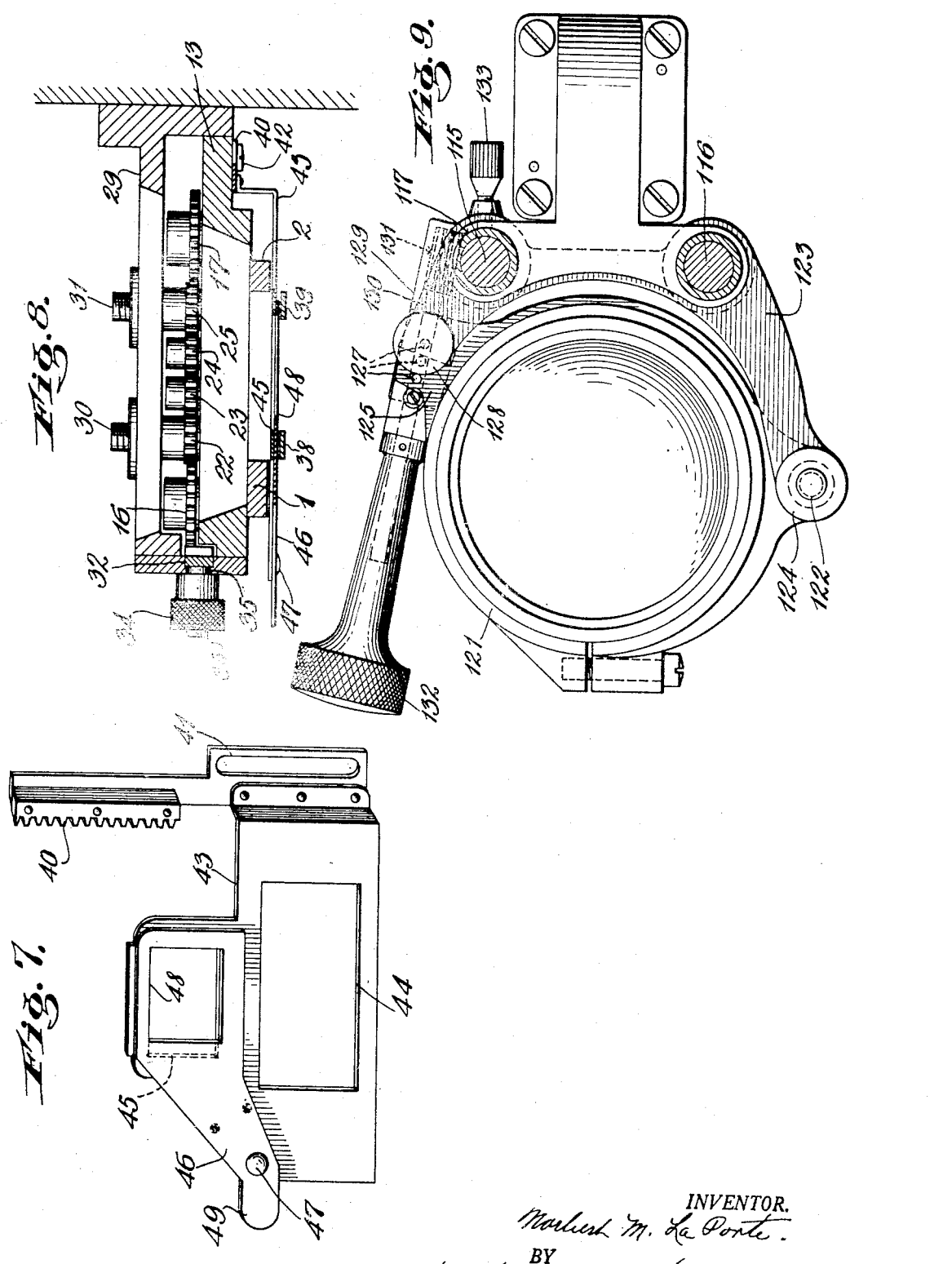

Patented July 2, 1935

2,007,018

UNITED STATES PATENT OFFICE 2,007,018

PROJECTING MECHANISM

Norbert M. La Porte, New York, N. Y.

Application March 13, 1930, Serial No. 435,393

31 Claims. (Cl. 88—17)

This invention relates to an improvement in projectors, and has for one of its objects a projector adapted for projecting films of different widths, for example, standard films, thirty-five millimeters in width and so-called wide films sixty-five millimeters in width, the apparatus being so constructed and arranged as to be capable of projecting sound and picture films interchangeably.

A further object of my invention is the provision of a projector of the general type above referred to in which but a single film track is employed, this track being so constructed and arranged, however, that it may be readily contracted and expanded so as to accommodate the projector to films of different widths.

A still further object of my invention is the provision of a projector in which the openings or apertures of the aperture mechanism and gate mechanism may be contracted and expanded to adapt the apparatus to its purpose, the openings or apertures being simultaneously adjustable.

A still further object of my invention is the provision of masking mechanism cooperating with the gate and aperture openings, this masking mechanism being provided with a plurality of openings suitably proportioned to the width of film to be projected, means being provided whereby an opening of the proper dimensions is moved into operative position with respect to the opening in the aperture mechanism and in the gate mechanism simultaneously with the setting of these mechanisms, the masking mechanism furthermore being so constructed and arranged as to adapt the projector for projecting sound and picture films of standard width as well as to projecting standard width film carrying pictures only.

A still further object of my invention is the provision of a projector in which means are provided for adjusting the size of the openings of the aperture mechanism and of the gate mechanism and setting the masking mechanism simultaneously.

A still further object of my invention is the provision of a projector in which means are provided whereby through the manipulation of a single operating means the aperture mechanism and gate mechanism may simultaneously be given a bodily and lateral movement so as to properly align these mechanisms with the sprockets of the intermittent mechanism of the projector.

A still further object of my invention is the provision of a projector in which means are provided for the rapid movement of the gate mechanism and lens system away from the aperture mechanism to enable the film to be threaded through the machine, this movement being effected without altering the focus of the lens system.

A still further object of my invention is the provision of a projector in which means are provided for quickly focusing the lens system and for giving the lens system a rocking movement, whereby the lens system may be quickly centered with respect to the film when it is desired to change from a sound and picture film to a picture film only, or vice versa.

Further objects of my invention will appear hereinafter.

In the drawings accompanying this application:

Fig. 2 is a section on the line 2—2 of Fig. 1;

Fig. 3 is a view similar to Fig. 2 but showing the parts thereof shifted so as to accommodate a wide film;

Fig. 4 is a view on the line 4—4 of Fig. 1;

Fig. 5 is a section on the line 5—5 of Fig. 1;

Fig. 6 is a view similar to Fig. 5 but showing the parts shifted so as to accommodate the same to wide film;

Fig. 7 is an elevational view of the masking mechanism;

Fig. 8 is a section on the line 8—8 of Fig. 2;

Fig. 9 is a section on the line 9—9 of Fig. 1; and

Fig. 10 is a view taken on the line 10—10 of Fig. 1.

*Aperture and masking mechanism*

Figure 1:
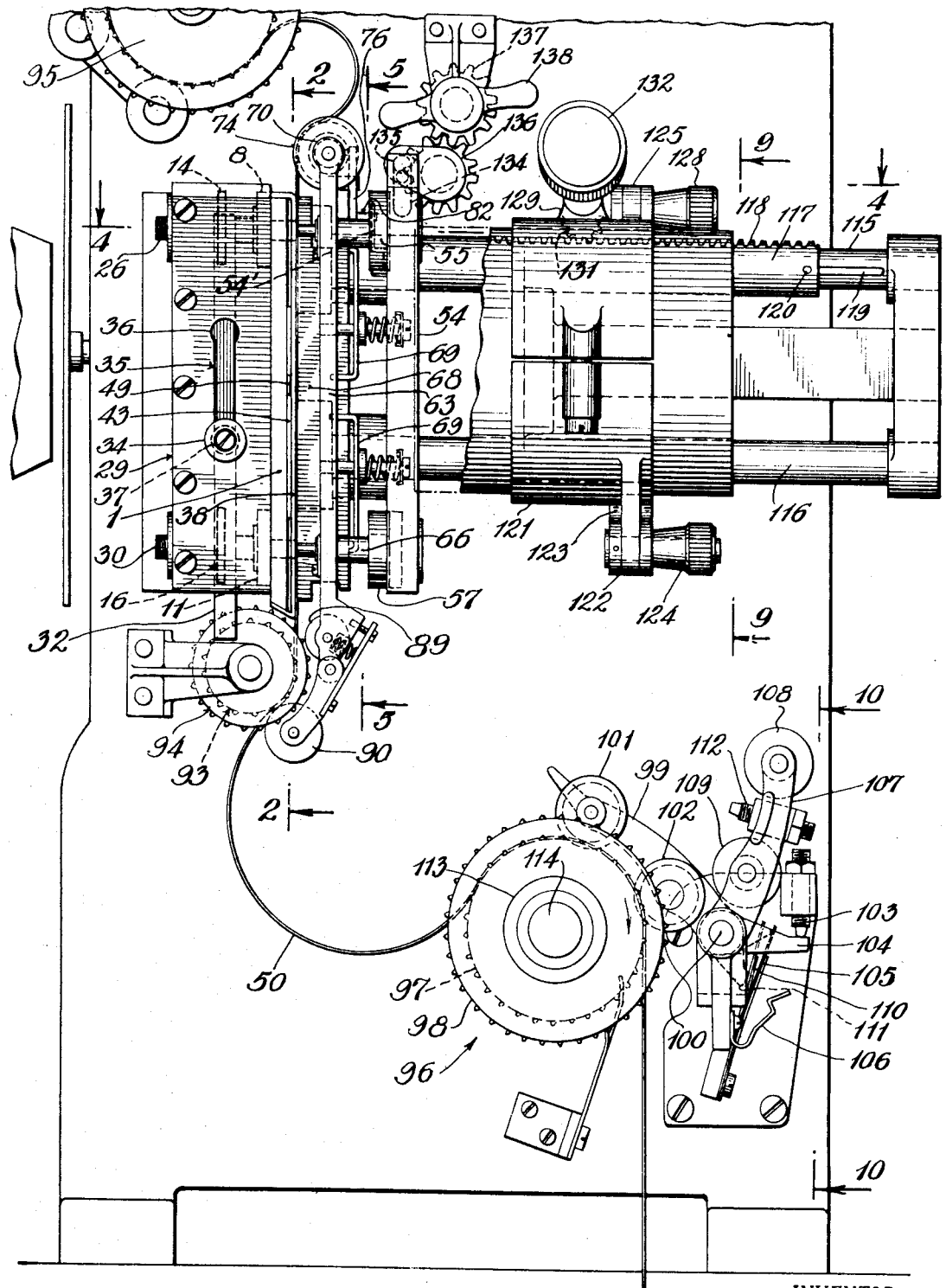
Fig. 1 is an elevational view of an embodiment of my invention.

The aperture and masking mechanisms are best shown in Figs. 2, 3, 4, 7 and 8, and referring to these figures of the drawings: The aperture mechanism comprises a pair of aperture-opening defining plates designated 1 and 2 provided adjacent the upper corners thereof with a boss 3 and 4, respectively. Adjacent the lower corners of these plates similar bosses 5 and 6 are provided. The upper boss 3 engages an eccentric pin 7 on the face of a disc 8, while the boss 4 receives a pin 9 eccentrically mounted on the face of a gear 10, the disc and gear being mounted adjacent the upper corners of the plates. The bosses 5 and 6 receive pins eccentrically mounted on the faces of discs 11 and 12 mounted adjacent the lower corners of plates 1 and 2. The disc 8, gear 10 and the discs 11 and 12 are all mounted in a plate 13 constituting a part of the aperture assembly.

Concentric with the disc 8 and gear 10, respectively, are gears 14 and 15, and intermediate these gears is a gear train composed of gears 18, 19, 20 and 21. Concentric with discs 11 and 12 are gears 16 and 17, respectively, and intermediate these gears is a gear train composed of gears 22, 23, 24 and 25. These gear trains enable motion of the gears 14 and 16, respectively, to be transmitted to the gears 10 and 17.

The gears 18 and 21 of the upper gear train are carried by threaded studs 26 and 27 of opposite hands and threaded into a plate 29. Likewise the gears 22 and 25 of the lower gear train are carried by threaded studs 30 and 31 of opposite hands and threaded into a plate 29.

Extending vertically along one side of the aperture assembly is a rack 32 meshing with the gears 14 and 16 at the upper and lower corners, respectively, of the aperture-opening defining plate 1. Vertical movement of this rack is provided for by an operating knob 33 rigidly fastened to the rack and having a resiliently mounted head 34. The stem of this knob is adapted to ride in a slot 35 in the side of the aperture assembly. Each end of this slot is enlarged as shown at 36 and 37 for receiving the reduced end of the head 34 of the rack operating member or knob 33. When it is desired to move the rack from the position shown in Fig. 2 to the position shown in Fig. 3, for example, the head 34 is pulled out of the enlargement 37 of the slot 32 and the rack and operating member moved upwardly to its limit of motion, whereupon when the head of the knob is released the reduced end thereof will enter the enlargement 36 of the slot 32 to lock the rack in its upward position. On motion in the opposite direction it will be apparent the reduced end of the operating knob will enter the enlargement 37 of the slot. The member 33, therefore, not only constitutes a rack operating means but also a rack locking means.

The plates 1 and 2 also carry rails 38 and 39, respectively, these rails constituting the single film track employed in my construction and being movable with the plates 1 and 2 so as to be contracted and expanded as will be explained presently to accommodate the machine to films of different widths.

Cooperating with the gear 10 at the upper corner of the plate 2 is a short mask-operating rack 40. This rack is provided with a slot 41 which receives a screw 42 in the plate 13 of the aperture assembly for guiding as well as limiting the movement of the rack.

Carried by the mask-operating rack section 40 is masking mechanism best seen in Fig. 7. This masking mechanism comprises a plate 43 extending transversely of the aperture mechanism and provided with a large opening 44 and a small opening 45 for accommodating wide and standard films, respectively. The openings 44 and 45 are so located in the masking plate 43 that in the adjusting of the opening in the aperture mechanism the proper mask opening will be moved into operative position, i. e., when projecting standard film the opening 45 will be moved abreast of the aperture opening and when projecting wide film the opening 44 will be moved into operative position.

The masking plate 43 is equipped with an auxiliary masking plate 46 pivoted at 47 and having an opening 48 narrower than the opening 45 in the plate 43. The purpose of this auxiliary plate is to adapt the mask for sound and silent films of standard width, the masking plate 46 being moved to the dotted line position shown in Fig. 2 when projecting action films but being moved into the full line position of Fig. 7 when projecting sound and action, at which time the sound track is masked off by the relatively narrow mask opening 48, so that it does not appear on the screen beside the picture.

The auxiliary plate 46 is adapted to be moved into and out of operative position with respect to the opening 45 in the masking plate 43 by a finger piece 49.

From all of the foregoing, therefore, it will be seen that with the parts in the position shown in Fig. 2 the film track has been contracted so as to accommodate the mechanism to standard width film. A section of standard width film is shown in Fig. 2 and designated 50. At this time also the aperture-defining plates 1 and 2 are in their contracted position to define a small aperture opening 51.

Now when it is desired to adjust the aperture mechanism so as to accommodate film of greater width than standard, such as the film 52 of Fig. 3, it is merely necessary to disengage the head 34 of the operating knob 33 from the enlargement 37 of the slot 32 in the side of the aperture mechanism and to pull upwardly on this member, thereby moving the rack 32 upwardly to the position shown in Fig. 3. This movement of the rack imparts rotation to the gears 14 and 16 in a clockwise direction, as viewed in Fig. 2, and through the gear trains above described movement in the opposite direction, i. e., anti-clockwise of the gears 10 and 17.

Through the eccentric connections above described of the plates 1 and 2 to the gears 14, 16, 10 and 17 the plates 1 and 2 will be moved laterally in an arc to the position shown in Fig. 3, wherein the aperture 51 has been expanded from the size shown in Fig. 2 to a size capable of accommodating the wide film 52.

In the operation of the rack 32 to expand the film track so as to accommodate wide film the rotation of the gears 18 and 21 of the upper gear train and the gears 22 and 25 of the lower gear train will impart corresponding movement to the oppositely threaded studs 26 and 27 and the oppositely threaded studs 30 and 31, thereby effecting a lateral movement of the aperture assembly, that is to say, of the plates 13, discs 8, 11 and 12, the gears 14, 16, 10 and 17 and their respective gear trains. A similar motion is also imparted to the film track and masking mechanism. The purpose of this bodily movement of the gear assembly, film track and masking mechanism is to properly align the aperture mechanism and the intermittent mounted below the aperture mechanism which will be referred to in more detail hereinafter.

On the upward movement of the rack 32 the mask-operating rack section 40 through its engagement with the gear 10 is moved upwardly to the position shown in Fig. 3 to impart corresponding movement to masking plate 43, thereby carrying mask opening 45 upwardly out of register with the aperture opening 51 and to bring the masking opening 44 into operative position.

It will be seen, therefore, that the aperture and mask mechanisms are so constructed and arranged as to adapt the machine for projecting films of different widths, such, for example, as standard film thirty-five millimeters in width and wider film sixty-five millimeters in width.

Gate mechanism

The gate mechanism is most clearly illustrated in Figs. 4, 5 and 6 and as will be seen from an inspection of these figures comprises a mount 54 carrying four discs designated 55, 56, 57 and 58, each of these discs being mounted on a threaded stud 59 threaded into the mount 54. The studs for discs 55 and 56 are threaded in the opposite hand, as are the studs for discs 57 and 58. Each of the discs is provided with a crank pin 60 which has its forward end reduced in diameter as shown at 61 to provide a pin entering a socket 62 provided for that purpose in the bosses on the disc 8, gear 10, discs 11 and 12, respectively, of the aperture mechanism. Inasmuch as when the gate and aperture mechanisms are assembled the discs 55, 56, 57 and 58 will be in register with the disc 8, gear 10 and discs 11 and 12, respectively, of the aperture mechanism, it will be apparent that a drive from the aperture mechanism is provided for the discs 55, 56, 57 and 58.

On the mount 54 and overlying the discs 55, 56, 57 and 58 are two overlapping plates 63 and 64 so shaped as to provide an opening or aperture 65. The plate 63 is provided with two bosses 66 which receive the pin 60 of the discs 55 and 57, while the plate 64 is provided with similar bosses 67 adapted to receive the pins 60 of the discs 56 and 58. It will be appreciated, therefore, that rotation of the discs of the gate mechanism will, through the eccentric connection just described of these discs to the plates 63 and 64, effect lateral movement of these plates with a consequent expansion or contraction, as the case may be, of the opening 65 provided by these plates.

Each of the plates 63 and 64 supports a vertically extending shoe 68 adapted to press a film being projected into engagement with the rails 38 and 39 of the film track. These shoes 68 are held under tension by spring-pressed arms 69.

The upper end of the plate 63 is extended upwardly as shown at 70, while the upper end of the plate 64 is similarly extended as shown at 71. The extension 70 supports a short hollow stub shaft 72, while the projection 71 carries a shaft 73 telescoped by the hollow stub shaft 72.

The stub shaft 72 carries a film guiding roller 74, while the shaft 73 carries a similar roller 75.

Secured to the stub shaft 72 is a lever 76 pivoted on the plate 63 intermediate its ends as shown at 77. Attached to the shaft 73 is a similar lever 78 pivoted on the plate 64 intermediate its ends as shown at 79.

In the stationary mount 54' I provide two arcuate slots 80 and 81. The slot 80 receives a pin 82 carried at the lower end of the lever 76, while the slot 81 receives a pin 83 carried at the lower end of the lever 78.

The distance in a straight line laterally from one end to the other of each of the slots 80 and 81 is shorter than the lateral travel of the plates 63 and 64.

From the description so far given, it will be apparent that when the discs 55, 56, 57 and 58 are caused to rotate through their driving connection to the aperture mechanism the plates 63 and 64 will be moved laterally to expand the aperture 65, for example, from the dimensions shown in Fig. 5 to the dimensions shown in Fig. 6, or vice versa.

It will be apparent also that on this movement of the plates 63 and 64 the film guiding rollers 74 and 75 will be moved away from or toward each other, as the case may be, through the levers 76 and 78 and their connection to the plates 63 and 64. It was pointed out above, however, that the straight line distance from one end to the other end of each of these slots is shorter than the throw of the discs 55, 56, 57 and 58, i. e., less than the lateral movement of plates 63 and 64.

It will be apparent, therefore, that on the outward movement of the plates 63 and 64 to expand the aperture 65 the lower ends of the levers 76 and 78 will engage the ends of their slots 80 and 81 before the plates 63 and 64 have reached the end of their movement. Consequently the continued movement of the plates 63 and 64 to the limit of their travel will effect an additional movement laterally of the rollers 74 and 75. In other words, if the rollers 74 and 75 were merely attached at 77 and 79 to the plates 63 and 64 then the movement of the rollers would be equal to the movement of the plates 63 and 64, but by reason of the fact that the levers 76 and 78 are pivoted on the plates 63 and 64 and have their lower ends engaging the arcuate slots 80 and 81, which slots are shorter than the path described by the bosses 66 and 67 on the discs 55 and 56, the movement of the lower ends of the levers 76 and 78 will cease before the plates 63 and 64 have reached the limit of their travel and consequently as just noted the rollers 74 and 75 will be given an additional movement. The purpose of this is to accommodate the machine to a condition existing in connection with standard film of thirty-five millimeters as compared with so-called wide film of sixty-five millimeters, for example.

In these two types of film the distance between the outer edge 84 of a standard film, such as that shown at 50, and the outside edge 85 of the sound track 53 is less than the distance between the outside edge 86 of the wide film 52 and the adjacent edge 87 of the sound track 88 and inasmuch as the gate opening must be adjusted with respect to the outer edge of the sound track and the rollers 74 and 75 with respect to the outside edges of the film it will be apparent that when passing from standard to wide film the rollers must be given a greater movement than the plates which define the gate opening.

The lower end of the opening-defining plate 63 carries a pair of presser rollers 89 and 90, while the opening-defining plate 64 carries at its lower end a pair of similar presser rollers 91 and 92. These rollers are adapted to cooperate with the film sprockets 93 and 94 of the intermittent, which will be presently described, and inasmuch as the sprockets 93 are for the purpose of accommodating the machine to standard film and the sprockets 94 to accommodate film of a greater width, it will be appreciated that these sprockets must be at different distances apart and that the rollers 89 and 90 must be correspondingly expanded or contracted, as the case may be, with respect to the rollers 91 and 92, depending upon whether standard or wide film is being projected, and it will be equally apparent that this movement or adjustment of these rollers is effected when the gate-opening defining plates 63 and 64 are adjusted as above described.

Intermittent

The intermittent mechanism is shown in elevation in Fig. 1 and simply comprises the intermittently driven feed sprockets 93 for accommodating films of standard width and intermittently driven feed sprockets 94 of larger diameter for accommodating films of a greater width.

The press rollers 89, 90, 91 and 92 just described as being carried by the gate-opening defining plates 63 and 64 of the gate mechanism are located adjacent the film feed sprockets so that when standard film 50 is being projected the press rollers will engage the feed sprocket 93 and when the gate mechanism is adjusted to project wider film then the press rollers will be moved laterally, as viewed in Fig. 6, and outwardly away from the axis of rotation of the film feed sprockets, as viewed in Fig. 1, to bring these rollers into position to hold the film against the feed sprockets 94.

Upper and lower take-up mechanism

Inasmuch as the upper and lower take-up mechanisms are similar in construction I have illustrated only the lower take-up in any detail. The upper take-up mechanism has been designated 95 and the lower 96. The description of the lower take-up mechanism will suffice for both.

This take-up mechanism comprises two pairs of driven sprockets 97 and 98, the sprockets 97 being provided for accommodating the apparatus to standard film and sprockets 98 for accommodating the apparatus to wider film.

Mounted to one side of these sprockets is an arm 99 pivoted at 100. This arm carries on or adjacent its outer end a pair of presser rollers 101 and intermediate its outer end and the pivot 100 a pair of rollers 102. When the device is in operation for narrow film the arm 99 and the rollers carried thereby are in the position shown on Fig. 1, the rollers 101 and 102 holding the film 50 in engagement with the sprocket 97. The pressure of these rollers on the film is controlled by an adjustable stop 103 which engages the nose 104 with which the arm 99 is provided, the arm being held against this stop by a leaf srping 105. When a wide film is to be substituted for the standard film 50 the arm 99 is merely swung upwardly on the pivot 100 so as to carry the rollers 101 and 102 away from the sprocket 97 so that the extension 104 engages a spring latch 106 to hold the arm in its raised or inoperative position.

A similar construction is provided for use when projecting wide film. This comprises a pair of arms 107 each of which carries at its outer end a roller 108 and intermediate its outer end and the pivot 100 a roller 109.

These arms are held in their raised or inoperative position, as shown in Fig. 1, by leaf springs 110 engaging a nose 111 on the arms, these leaf springs also holding the arms down when the arms are in operative position. The pressure of these rollers 108 and 109 on the film is controlled by a threaded stud 112 which engages the surface of the bearing 113 for the shaft 114 carrying the take-up sprockets.

Lens focusing and adjusting mechanism

The member 54 of the gate mechanism which has already been referred to as carrying the discs 55, 56, 57 and 58 is supported by a sleeve 117 sliding on the upper of two lens-mount-supporting rods 115 and 116. These rods extend lengthwise of the projector, the rod 115 being disposed above the rod 116. The rack sleeve 117 is provided with rack teeth 118. This rack sleeve 117 has movement longitudinally of the lens-mount-supporting rod 115, and to prevent relative rotation of the sleeve and rod I provide the rod with a slot 119 cooperating with a pin 120 in the rack sleeve.

The lens mount comprises a split ring 121 pivoted at 122 on a lens-mount casting 123 which is carried on the lens-mount-supporting rods 115 and 116, as will be apparent from Fig. 9. The lens mount ring 121 is held in adjusted position with respect to pivot 122 by a centering lock 124. To determine the amount of pivoting of the ring on its pivot the ring is provided with an extension 125 which enters a slot 126 in the lens-mount casting 123. The extension is provided with holes 127 and a pin 128 which is carried by the casting 123 passes into any one of these holes, depending upon the position in which the lens ring is to be held.

The lens-mount casting adjacent the rack sleeve 117 is provided with a bearing 129 for receiving a shaft 130 provided with a pinion 131 meshing with the teeth 118 of the rack sleeve 117. The pinion shaft is rotated by a knob 132 and when this knob and shaft are rotated movement will be imparted to the lens mount to cause the same to travel along rack sleeve 117 to focus the lens system. The adjustment is maintained by a focus lock screw 133.

This apparatus, therefore, provides for swinging of the lens system about the pivot 122 so as to center the lens system on the film and also for movement of the lens system longitudinally to focus the system.

Film threading mechanism

The member 54 which carries the gate mechanism is provided adjacent the top thereof with a vertically extending slot 134 in which rides a pin 135 eccentrically mounted on one face of a gear 136. This gear which is mounted on any suitable part of the apparatus meshes with a gear 137 adapted to be rotated by a handle 138. Offset from and letting into the slot 134 is a bore 139 provided with a locking ball 140 backed by a spring 141. As the handle 138 is turned to rotate gears 137 and 136 the engagement of the pin 135 in the slot in the member 54 will move the latter sideways along the lens-mount supporting rods 115 and 116, and in the travel of the parts to the right, as viewed in Fig. 1, pin 135 will snap past the lock ball 140 and when the parts have reached their final movement the pin will have traversed its slot and will snap past this ball in the opposite direction so as to lie on the same side of the ball as shown in Fig. 5.

Consequently this locking ball 140 will hold the gear 136 against rotation at both limits of movement of the gear. The movement of the member 54 laterally will, as will be understood, carry with it the gate mechanism, the driving connection of the gate mechanism to the aperture mechanism being disconnected on this operation and the pressure shoes 68 being moved away from position to hold the film against the film rails constituting the film track. In other words, ample space will be provided between the film track and the spring-pressed film engaging members 68 to permit of the film being threaded through the mechanism from the upper take-up 95 downwardly between the aperture and gate mechanisms to the intermittent mechanism below the gate and aperture mechanisms and from thence to the lower take-up.

Operation

In the operation of my improved machine it will be understood, of course, that the parts are assembled as shown in Fig. 1 and also as seen in Fig. 4. We will assume also that the machine is empty and that it is desired to project standard width film, such as shown in Fig. 2, the same being provided with a sound track.

The first operation is to move the gate mechanism bodily away from the aperture mechanism in order to provide room for threading the film between these two mechanisms from the upper take-up 95 to the intermittent mechanism shown beneath the gate and aperture mechanisms. To effect this movement of the gate mechanism the handle 138 is rotated in a clockwise direction, as viewed in Fig. 1, to impart rotation to gear 136 in the opposite direction, whereby the engagement of the pin 135 carried by the gear 136 with the slot in the plate 54 will move the plate and all the mechanism carried thereby to the right, as viewed in Fig. 1, i. e., in a direction away from the aperture mechanism, where it will be locked as above explained. On this movement it will be appreciated the driving connection between the aperture and gate mechanisms will be disconnected. The lens system is also moved laterally on this movement but without effecting any change in the position of the lenses of the lens system with respect to the gate.

Ample room is thus provided between the gate and aperture mechanisms to permit of a film 50 to be passed from the upper take-up 95 down between the aperture and gate mechanisms along the film rails 38 and 39 composing the film track and from thence into engagement with the small sprockets 93 of the intermittent mechanism, between them and the rollers 89, 90, 91 and 92 which latter by the above-described movement of the gate mechanism have been moved away from this sprocket as will be understood. From thence the film is passed to the sprocket 97 of the lower take-up mechanism and the arm 99 moved over into position to permit the rollers 101 and 102 carried thereby to hold the film on the sprocket.

As above mentioned it is assumed that the sound recorded at 53 on the film is not to be projected to the screen. Consequently the masking plate 46 will be left in the position shown in Fig. 7 with respect to the opening 45 in the masking plate 43. The hand wheel 138 is then rotated in an anti-clockwise direction so as to throw the gate mechanism back to its original position with respect to the aperture mechanism and the machine is now ready to operate except for any adjustment of the lens system that may be necessary.

If it is necessary to focus the lens system the locking screw 133 is loosened and the knob 132 turned in the proper direction to move the lens mount along the rack sleeve 117 toward or away from the gate mechanism, as the case may be, until the desired focus is obtained. If the lens system is not accurately located with respect to the film, that is to say, is not centrally located it is then necessary to loosen the centering locks 124 and 130 to rock the lens system, for example, from right to left, as viewed in Fig. 9, to place the pin 128 in the correct hole 127.

If it should be desired to project film having no sound record then it will be understood the masking plate 46 must be moved to the dotted line position shown in Fig. 2 to permit of an exposure through the full small opening 45 of the masking plate 43. The lens system must then be adjusted accordingly accurately to center with the picture on the film.

In changing from a standard width film to a film of greater width, it is necessary that the film track be expanded, that the aperture opening and the gate opening be expanded and that the aperture 44 of the masking mechanism be moved into operative position. It is also necessary that the aperture and gate mechanisms be moved bodily to the right, as viewed in Fig. 1, so as to properly align the film with the large sprocket 94.

Accordingly the operating member 33 is moved upwardly from the position shown in Fig. 2 to that shown in Fig. 3 to impart a similar movement to the rack 32. This actuation of the rack will, through the mechanism above described, effect a spreading of the rails and a corresponding spread or expansion of the aperture-opening defining members or plates 1 and 2 so that the aperture 51 will be expanded laterally to the dimensions shown on Fig. 3 from the size shown in Fig. 2. This same movement of the rack also effects, through the rack 40, an upward movement of the masking plate 43 to bring the large aperture 44 therein abreast of the enlarged or expanded aperture 51 of the aperture mechanism. The parts are shown in this expanded position in Fig. 3.

This same movement of the rack mechanism effects a bodily lateral movement to the right, as viewed in Fig. 1, of the entire aperture mechanism assembly through the rotation of the threaded studs 26, 27, 30 and 31. This movement of the aperture assembly is to carry the same into position where the rails 38 and 39 will be properly aligned with the periphery of the large sprockets 94 of the intermittent mechanism.

This same movement of the aperture mechanism imparts expanding movement to the gate mechanism through the driving connections above described, so that the opening 65 of the gate will be expanded laterally from the size shown in Fig. 5 to the dimensions shown in Fig. 6, the opening in the gate now corresponding in size to the increased dimensions of the opening 55 of the aperture mechanism as well as a bodily lateral movement, through the oppositely threaded studs mounting the discs, of the gate mechanism. There is also at the same time imparted an expanding movement to the rollers 74 and 75 and the pressure rollers 89, 90, 91 and 92 and the intermittent mechanism so that rollers 74 and 75 are brought into guiding position relatively to the edges of the wider film now to be projected and so that the presser rollers may be brought into proper relation to the peripheries of the sprockets 94 of the intermittent mechanism.

This movement of the gate mechanism is also accompanied by a bodily lateral movement of the presser rollers cooperating with the feed sprockets of the intermittent to bring these rollers into operative relation to large feed sprockets 94 of the intermittent.

After these adjustments have been made the handle 138 may be moved in the proper direction to move the entire gate assembly and lens system to the right away from the aperture mechanism to permit of threading of the wide film through the machine, this threading being accomplished as described in connection with the standard width film.

What I claim is:—

1. Aperture mechanism for projectors comprising in combination a pair of plates defining an aperture opening, a single film track attached to said plates and cooperating with said opening, and means for moving said plates laterally to expand and contract said film track and aperture opening simultaneously to accommodate films of different widths.

2. Projector mechanism comprising in combination a pair of rails constituting a single film track, concentrically disposed pairs of fixed feed sprockets of different diameters, the sprockets of one pair being at a different distance apart from the other pair, and means for imparting bodily movement to said rails perpendicular to the axis of rotation of said sprockets to move the rails from a position in line with the periphery of one pair of sprockets to a position in line with the periphery of the other pair of sprockets.

3. Aperture mechanism for projectors comprising in combination a pair of plates lying in the same plane and shaped to provide an aperture opening, a pair of rails constituting a single film track operatively connected to said plates, and means for effecting lateral movement of said plates with the consequent lateral movement of said rails to vary the width of the aperture opening and simultaneously the width of the film track provided by said rails.

4. Aperture mechanism for projectors comprising in combination a pair of plates disposed side by side and shaped to provide an aperture opening, a pair of rails constituting a single film track carried by said plates, means for simultaneously imparting movement to said plates in the plane thereof and to said rails thereby to vary the width of the aperture opening and the width of the film track provided by said rails, and means for effecting movement of said plates and rails in a direction perpendicular to the plane of the plates.

5. Aperture mechanism for projectors comprising in combination aperture plates, rails constituting a single film track attached to said plates, pairs of concentrically disposed feed sprockets of different diameters disposed adjacent said plate and rail structure, and means for effecting a bodily movement of said plates and rails perpendicular to the axis of rotation of said sprockets whereby the rails may be moved from a position approximately in line with the periphery of one pair of said feed sprockets to a position approximately in line with the periphery of another pair of said feed sprockets of different diameter.

6. Aperture mechanism for projectors comprising in combination a pair of aperture-opening defining plates, rotary driving members eccentrically attached thereto, rack and pinion mechanism for driving said rotary members thereby to effect a lateral movement of said plates toward and away from each other to vary the width of the aperture opening defined thereby, an operating member attached to said rack, said operating member being provided with a resiliently mounted head, the aperture mechanism being provided with a slot for receiving the stem of said operating member, said slot being provided with enlarged areas for the reception of the resiliently mounted head of said operating member whereby the rack will be locked in adjusted position.

7. Aperture mechanism for projectors comprising in combination a pair of aperture-opening defining plates, rails providing a single film track attached to said plates, rotary driving discs eccentrically attached to said plates and rotatable in planes parallel to said plates, and means for rotating said driving discs to move the plates and rails laterally with respect to each other to vary the dimensions of the aperture opening defined thereby and correspondingly to vary the width of the film track.

8. Aperture mechanism for projectors comprising in combination a pair of aperture-opening defining plates, rails constituting a single film track attached to said plates, rotary driving members eccentrically attached to said plates, and rack and pinion mechanism for driving said rotary members simultaneously thereby to effect a simultaneous movement of said plates and rails laterally to vary the size of the aperture opening and correspondingly to vary the distance between said rails to vary the width of said track.

9. Aperture mechanism for projectors comprising in combination a pair of aperture-opening defining plates, rails providing a single film track attached to said plates, rotary driving discs eccentrically attached thereto and rotatable in planes parallel to said plates, and rack and pinion mechanism for rotating said discs thereby simultaneously to move said plates and said rails laterally toward and away from each other to effect a variation in the size of the aperture opening defined by said plates and simultaneously to vary the width of the film track.

10. Aperture mechanism for projectors comprising in combination a pair of aperture-opening defining plates, rails providing a single film track attached to said plates, rotary driving discs eccentrically attached thereto and rotatable in planes parallel to said plates, a rack for rotating said discs to effect a variation in the relative positions of said plates, thereby to vary the size of the aperture opening defined by said plates, and simultaneously to vary the width of the film track, and means for locking the rack in adjusted position.

11. Aperture mechanism for projectors comprising in combination a pair of aperture opening defining plates, pairs of rotary members eccentrically attached to said plates, gear trains for operatively connecting said pairs of driving members, means for rotating said gear trains to effect a lateral movement of said plates to vary the size of the aperture opening defined thereby, a mount for said plates and gear trains, and a connection between the mount and said gears to move said plates during their lateral movement in a direction perpendicular to said lateral movement.

12. Aperture mechanism for projectors comprising in combination a pair of aperture-opening defining plates, two pairs of rotary driving members, an eccentric connection between one pair of said driving members and one of said plates, a similar connection between the other pair of driving members and the other of said plates, gear trains for connecting the driving members attached to one plate to the driving members attached to the other plate, a rack for driving said rotary members whereby said plates will be moved toward and away from each other to contract and expand the aperture opening defined thereby, two pairs of oppositely threaded studs mounting a portion of said gear trains, and a fixed threaded bearing for said studs, so that rotation of said trains to expand and contract the aperture-opening defining plates, will move said plates perpendicular to their lateral movement.

13. Aperture mechanism and masking mechanism for projecting machines comprising in combination a pair of aperture-opening defining plates, means for varying the distance between said plates to effect a variation in the size of the aperture opening defined thereby, masking mechanism provided with a plurality of mask openings adapted to cooperate with the aperture opening, and a connection between the means for varying the distance between said plates and said masking mechanism to effect a movement of said masking mechanism at right angles to the movement of said plates when varying the size of the aperture opening defined by said plates to bring a predetermined mask opening into register with said aperture opening.

14. Aperture mechanism and masking mechanism for projecting machines comprising in combination a plurality of aperture-opening defining plates, rack and gear mechanism for contracting and expanding said plates thereby to effect a variation in the size of the aperture opening defined thereby, and masking mechanism, provided with a plurality of mask openings, actuated by said rack and gear mechanism to bring the proper opening in the masking mechanism into register with the aperture opening simultaneously with the varying of the size of said opening.

15. Aperture mechanism and masking mechanism for projecting machines comprising in combination a pair of aperture-opening defining plates, rack and gear mechanism for moving said plates laterally in the plane thereof to vary the size of the aperture opening defined thereby, masking mechanism provided with a plurality of apertures, and a rack affixed to said masking mechanism and cooperable with said rack and gear mechanism whereby upon lateral movement of said aperture-opening defining plates the masking mechanism will be moved vertically to bring a preselected opening therein into register with a preselected width of aperture opening.

16. Aperture mechanism and masking mechanism for projecting machines comprising in combination a pair of adjustable plates for defining an aperture opening of varying width, masking mechanism provided with a plurality of openings of different sizes and operatively connected to said aperture mechanism whereby upon adjustment of the plates of the aperture mechanism to vary the size of the aperture opening a mask opening of a corresponding size will be moved into operative position with respect to the aperture opening, and means for varying the size of one of the mask openings in said masking mechanism.

17. In projecting mechanism the combination of aperture mechanism comprising a pair of plates defining an aperture opening, gate mechanism comprising another pair of plates defining a gate opening, and means for simultaneously moving the said plates laterally to vary the width of the opening provided by one pair of said plates in the aperture mechanism, and the width of the opening provided by the other pair of plates in the gate mechanism.

18. Gate mechanism for projecting machines comprising in combination a pair of gate opening defining plates, a pair of discs eccentrically attached to one of said plates, a disc and a gear attached eccentrically to the other of said plates, and rack and gear mechanism for rotating said discs and gear simultaneously to effect lateral movement of said plates to vary the width of the gate opening defined thereby.

19. In a projecting machine the combination of aperture mechanism comprising a pair of plates defining an aperture opening, gate mechanism comprising a pair of plates defining a gate opening, said aperture opening defining plates and gate opening defining plates being disposed in juxtaposition to each other, means for moving the said aperture plates laterally to vary the size of the aperture opening defined thereby, and means simultaneously to move the gate opening defining plates laterally to vary the size of the gate opening defined thereby.

20. In a projecting machine, the combination of aperture mechanism comprising a pair of plates, rails constituting a single film track attached to said plates, gate mechanism adjacent the aperture mechanism, pairs of stationary feed sprockets of different diameters adjacent said aperture mechanism, gate mechanism and rail structure, and means for moving said plates laterally and said gate mechanism and said rail structure simultaneously to expand and contract said film track and aperture opening simultaneously and to move said aperture mechanism, gate mechanism and rail structure out of predetermined position with relation to one pair of said feed sprockets and into operative position with relation to another pair of said feed sprockets to accommodate films of different widths.

21. Gate mechanism for projecting machines comprising in combination a pair of adjustable plates defining an adjustable gate opening, and a pair of film guiding rollers movable with said gate-opening defining plates whereby upon contraction and expansion of the gate opening the film guiding rollers will be given a corresponding movement.

22. Gate mechanism for projecting machines adapted to project films of different width and comprising in combination an adjustable structure for defining an adjustable gate opening, adjustable film guiding rollers adapted to engage the edge of the film as the same passes in front of said gate opening, and an operative connection between said gate opening mechanism and the rollers whereby upon adjustment of the gate opening the rollers will be moved to position to accommodate a film corresponding in width to the gate opening as adjusted.

23. In a projecting machine the combination of gate mechanism defining a gate opening, pairs of fixed feed sprockets of different diameters mounted adjacent the gate mechanism, means for varying the width of said gate opening, and film presser rollers carried by said gate mechanism and cooperable with said feed sprockets, said presser rollers moving with adjustment of the gate opening mechanism out of operative position with respect to one pair of said feed sprockets and into operative position with respect to another pair of said feed sprockets.

24. In projecting machines the combination of gate mechanism comprising a pair of film guiding rollers, a pair of film sprockets for accommodating films of one width, another pair of film sprockets for accommodating films of a different width, said film guiding rollers cooperating with said sprockets, and means for shifting said film guiding rollers to vary the distance between them, the film rollers on one setting cooperating with one pair of said sprockets and on another setting cooperating with the other pair of sprockets.

25. Gate mechanism for projecting machines comprising in combination a pair of gate-opening defining plates, a pair of film guiding rollers carried thereby, a pair of film presser rollers carried thereby, and means for effecting simultaneously lateral movement of said gate-opening defining plates, said film guiding rollers and said film presser rollers.

26. Gate mechanism for projecting machines comprising in combination a pair of gate-opening defining plates, means for moving said plates toward and away from each other to vary the size of the opening defined thereby, film guiding rollers cooperating with said gate opening, levers pivoted on said plates and operatively connected to said rollers, and a member fixed with respect to said plates and provided with slots engaged by the ends of said levers remote from the rollers and the travel of the levers in said slots being so limited that the ends of the slots will be reached before the aperture-opening defining plates have reached the limit of their movement away from each other whereby said film guiding rollers will be given a spreading motion in excess of that imparted to the gate-opening defining plates.

27. In a projecting machine the combination of aperture mechanism and juxtaposed gate mechanism, a driving connection between the aperture mechanism and gate mechanism whereby the aperture opening and gate opening may be simultaneously varied, and means for moving the gate mechanism away from the aperture mechanism, this movement of the gate mechanism effecting a disconnection of the driving connection between the aperture and gate mechanisms.

28. In a projecting machine the combination of aperture mechanism and juxtaposed gate mechanism, and means for moving the gate mechanism bodily in a lateral direction away from the aperture mechanism and comprising a driven member eccentrically connected through a slot and pin connection to the gate mechanism whereby upon rotation of said driven member the gate mechanism will be moved laterally.

29. In a projecting machine the combination of aperture mechanism and juxtaposed gate mechanism, a driven member, a pin eccentrically carried thereby and engaging a slot provided in the gate mechanism whereby upon rotation of the driven member the gate mechanism will be moved laterally away from and toward the aperture mechanism, and a lock cooperating with said pin for locking the gate mechanism in either of its two positions.

30. In a projecting machine the combination of aperture mechanism and juxtaposed gate mechanism, a driven member mounted adjacent the gate mechanism, a pin eccentrically carried thereon and riding in a slot provided in the gate mechanism, a resiliently mounted ball adjacent said slot and engageable with said pin, movement of said driven member effecting bodily movement laterally of the gate mechanism away from and toward the aperture mechanism and said ball being operative to lock said pin in either of two positions of the gate mechanism.

31. In a projector machine the combination of aperture mechanism and gate mechanism, means for varying the size of the aperture opening and the size of the gate opening, a driving connection between said adjusting means whereby the adjustment of the aperture opening will be effected simultaneously with the adjustment of the gate opening, driven means adjacent the gate mechanism for moving the gate mechanism bodily away from the aperture mechanism and at the same time to disconnect the operative connection between the aperture mechanism and gate mechanism, said connection being reestablished automatically upon movement of the gate mechanism in the opposite direction toward the aperture mechanism.

NORBERT M. LA PORTE.